United States Patent
Choate

(10) Patent No.: US 11,266,136 B2
(45) Date of Patent: Mar. 8, 2022

(54) SPINNER BAIT WITH HYDRO-DRIVE RATTLE

(71) Applicant: Chris Allen Choate, Brighton, MO (US)

(72) Inventor: Chris Allen Choate, Brighton, MO (US)

(*) Notice: Subject to any disclaimer, the term of this patent is extended or adjusted under 35 U.S.C. 154(b) by 310 days.

(21) Appl. No.: 16/550,886

(22) Filed: Aug. 26, 2019

(65) Prior Publication Data

US 2020/0060248 A1 Feb. 27, 2020

Related U.S. Application Data

(60) Provisional application No. 62/722,430, filed on Aug. 24, 2018.

(51) Int. Cl.
*A01K 85/10* (2006.01)
*A01K 85/08* (2006.01)

(52) U.S. Cl.
CPC .............. *A01K 85/10* (2013.01); *A01K 85/08* (2013.01)

(58) Field of Classification Search
CPC ........ A01K 85/01; A01K 85/08; A01K 85/01; A01K 85/00–18; A01K 85/10
See application file for complete search history.

(56) References Cited

U.S. PATENT DOCUMENTS

| | | | |
|---|---|---|---|
| 2,902,791 A | 9/1959 | Woodley | |
| 3,112,576 A | 12/1963 | Tay | |
| 3,987,576 A | 10/1976 | Strader | |
| 4,209,932 A * | 7/1980 | Pate | A01K 85/00 43/42.11 |
| 4,641,455 A | 2/1987 | Johnson | |
| 4,793,089 A * | 12/1988 | Long | A01K 85/00 43/42.13 |
| 4,850,131 A | 7/1989 | Standish, Jr. | |
| 4,930,247 A | 6/1990 | Dubois | |
| 5,050,334 A | 9/1991 | Standish, Jr. | |
| 5,201,784 A | 4/1993 | McWilliams | |
| 5,499,470 A | 3/1996 | Reed | |
| 5,566,497 A | 10/1996 | Oesterreich | |
| 5,605,004 A * | 2/1997 | Boullt | A01K 85/00 43/42.13 |
| 6,155,000 A | 12/2000 | Ravencroft | |
| 6,880,287 B2 | 4/2005 | Eubanks | |
| 6,918,204 B1 | 7/2005 | Trantham | |
| 6,955,004 B2 | 10/2005 | Phipps | |
| 2003/0037478 A1* | 2/2003 | Hisaw | A01K 85/00 43/17.1 |
| 2004/0006908 A1* | 1/2004 | Essad | A01K 85/00 43/42.13 |
| 2009/0145017 A1* | 6/2009 | Richey | A01K 85/08 43/43.14 |

* cited by examiner

*Primary Examiner* — Timothy D Collins
*Assistant Examiner* — Maria E Graber
(74) *Attorney, Agent, or Firm* — Dunlap Bennett & Ludwig, PLLC

(57) ABSTRACT

A spinner bait lure includes a wire harness having a line eye. A fishing hook is coupled to the wire harness. A spinner blade is rotatably coupled to the wire harness. A bead is rotatably coupled to the wire harness. Retrieval of the spinner bait lure through a water body causes the spinner blade and the bead to rotate. The spinner blade and the bead rotate about a common axis of rotation and a path of rotation of the bead intersects with the spinner blade. Therefore, the bead knocks into the spinner blade, causing deflection and noise.

10 Claims, 4 Drawing Sheets

SPINNER BAIT WITH HYDRO-DRIVE RATTLE

CROSS-REFERENCE TO RELATED APPLICATION

This application claims the benefit of priority of U.S. provisional application No. 62/722,430, filed Aug. 24, 2018, the contents of which are herein incorporated by reference.

BACKGROUND OF THE INVENTION

The present invention relates to fishing lures and, more particularly, to a spinner bait with a hydro-drive rattle.

Spinner bait lures are one of the most effective types of baits for catching fish, and particularly bass. Spinner bait lures are generally characterized by a body portion which may be shaped into a desired configuration, a hook extending rearwardly of the body portion, a skirt mounted on the body portion for concealing the hook and lending a life-like appearance to the lure as the lure is retrieved, and a straight or L-shaped wire harness extending from the body portion for mounting one or more spinners, attaching a fishing line and retrieving the lure.

The spinner bait lure is characteristically used in shallow water and is retrieved at varying speeds at depths ranging from a few inches to several feet beneath the surface of the water, with the spinner or spinners rotating as the lure is pulled toward the fisherman. The flashing spinner or spinners attract fish from a wide area of water and the plastic or rubber-stranded skirt undulates and ripples as the lure is retrieved, thereby further enhancing the attractiveness of the lure to the fish. In other designs, the spinner or spinners may be tandem-mounted on a single wire or flexible member and the lure may or may not have a skirt attached thereto.

Current spinner baits are pulled in a straight line through the water when retrieved by a fisherman, resulting in action limited to retrieval speed. Current spinners are unable to mimic deflection unless the spinner strikes a submerged object which often causes a fish to strike. Additionally, current spinner baits do not have a built-in noise maker.

As can be seen, there is a need for a spinner bait that produces increased action and noise.

SUMMARY OF THE INVENTION

In one aspect of the present invention, a spinner bait lure comprises: a wire harness comprising a line eye; a fishing hook coupled to the wire harness; a spinner blade rotatably coupled to the wire harness; and a bead rotatably coupled to the wire harness, wherein retrieval of the spinner bait lure through a water body causes the spinner blade and the bead to rotate, and a path of rotation of the bead intersects with the spinner blade.

These and other features, aspects and advantages of the present invention will become better understood with reference to the following drawings, description and claims.

DETAILED DESCRIPTION OF THE INVENTION

Figure 1:
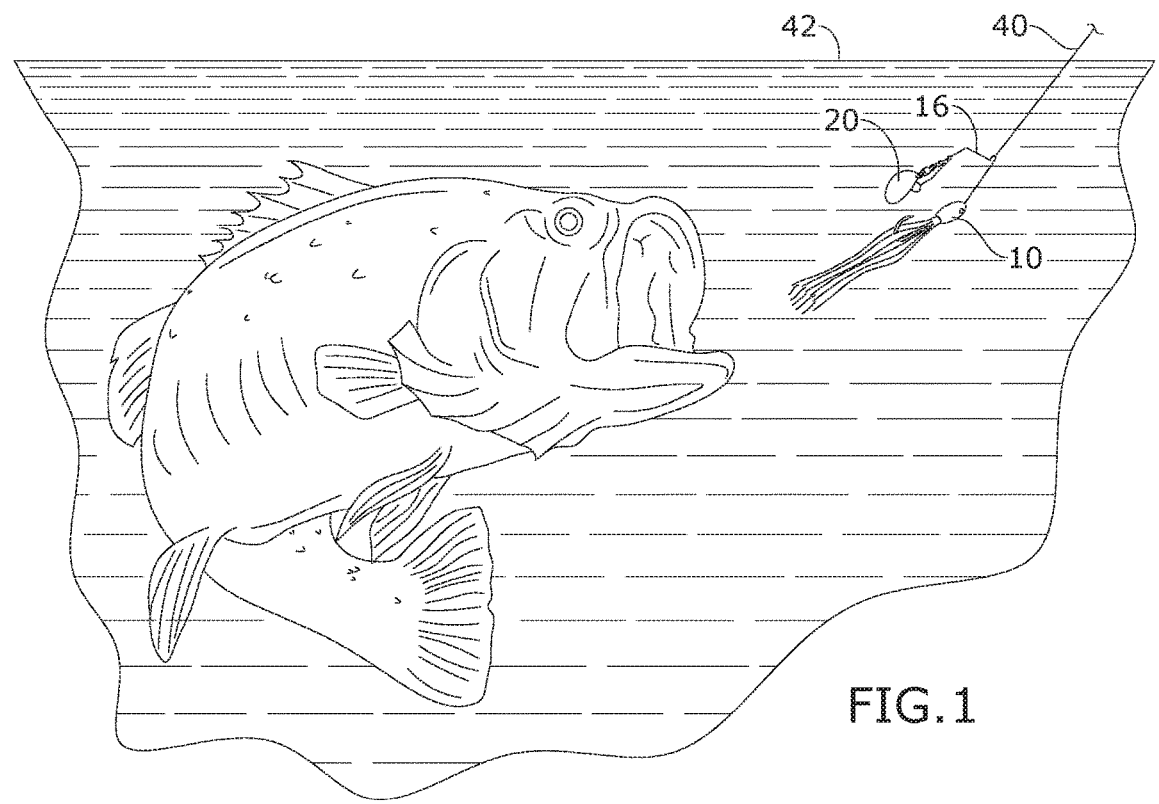
FIG. 1 is a perspective view of an embodiment of the present invention, shown in use.
Figure 2:
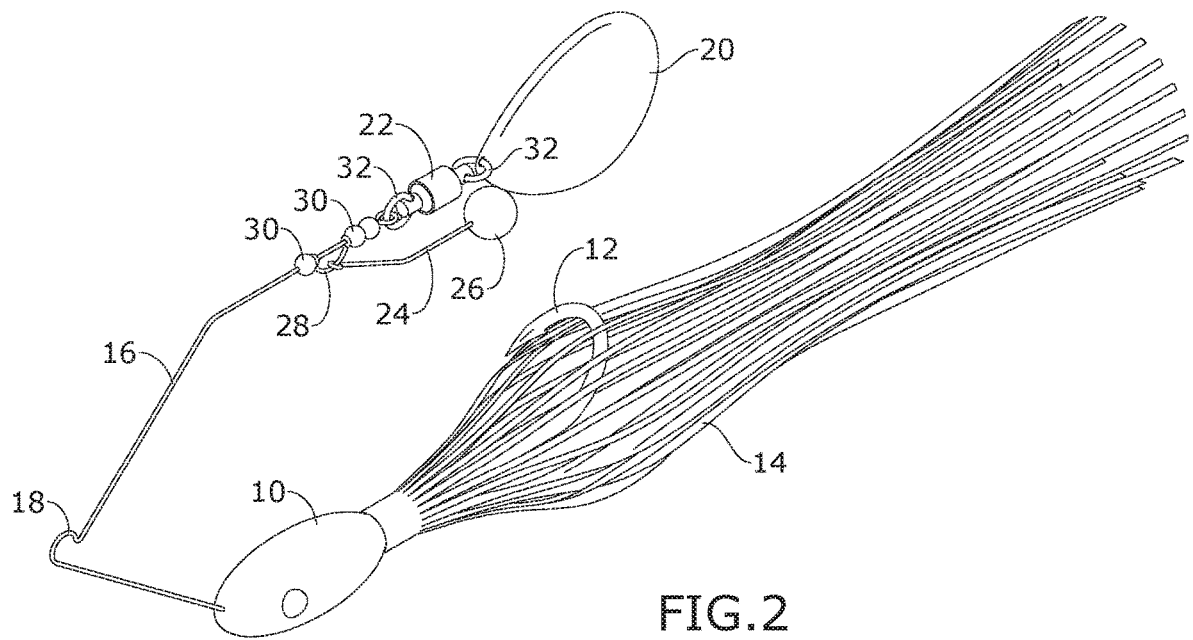
FIG. 2 is a perspective view of an embodiment of the present invention.
Figure 3:
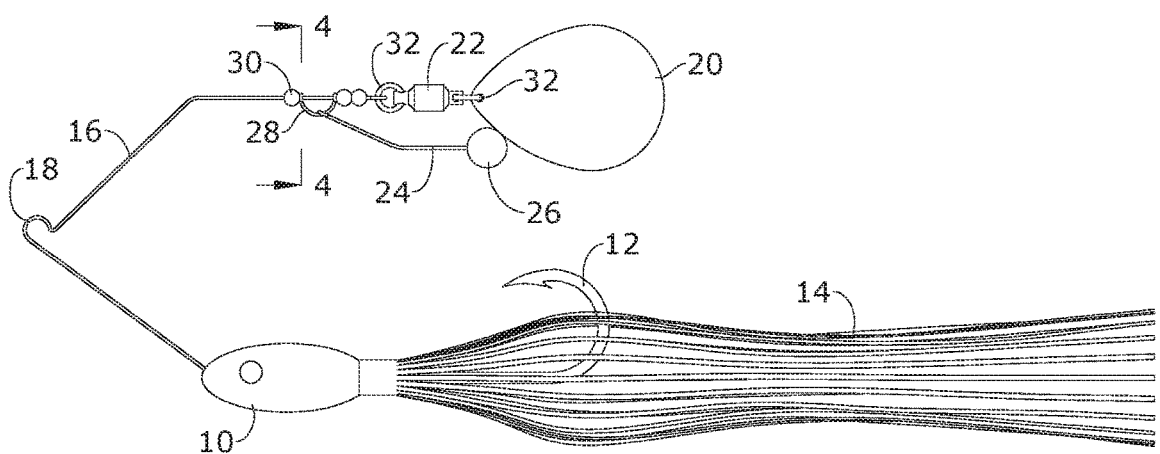
FIG. 3 is a side view of an embodiment of the present invention.
Figure 4:
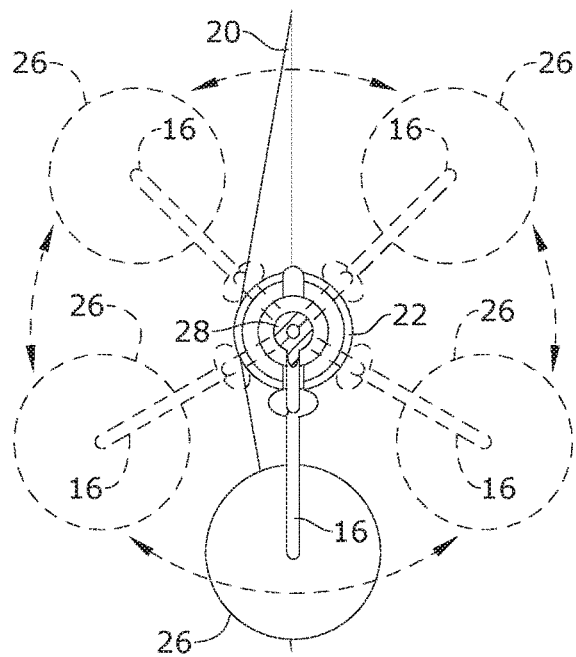
FIG. 4 is a section view of the present invention, taken along line 4-4 in FIG. 3.
Figure 5:
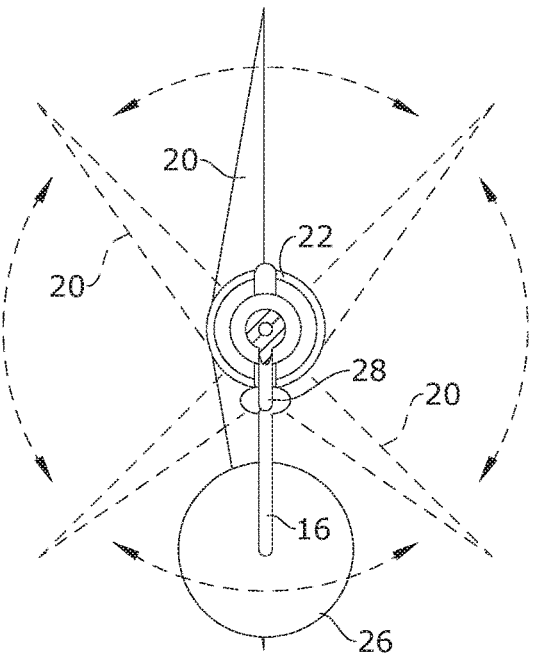
FIG. 5 is a section view of an embodiment of the present invention, illustrating a spinning motion.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a spinnerbait with a hydro-drive rattle system. The present invention adds intermittent sound and action when retrieved through water, that can be adjusted and controlled by a fisherman, resulting in a clicking sound and action similar to a wounded or fleeing bait fish. The present invention has a built-in intermittent deflection mechanism that causes reaction strikes from fish. Using the present invention, a fisherman can control CPM (clicks per minute). This is important when patterning a fish's feeding mood to trigger strikes. The wire with a bend can be adjusted by the fisherman to cause more or less erratic action upon retrieval.

Referring to FIGS. 1 through 5 and 7 through 9, the present invention includes a spinner bait lure. The spinner bait lure includes a wire harness 16, 36 having a line eye 18, 38. A fishing hook 12 is coupled to the wire harness 16, 36. A spinner blade 20 is rotatably coupled to the wire harness 16, 36 and a bead 26 is rotatably coupled to the wire harness 16, 36. Retrieval of the spinner bait lure through a water body 42 causes the spinner blade 20 and the bead 26 to rotate. The spinner blade 20 and the bead 26 rotate about a common axis of rotation and a path of rotation of the bead 26 intersects with the spinner blade 20. Therefore, the bead 26 knocks into the spinner blade 20, causing deflection and noise.

In certain embodiments, the bead 26 is rotatably coupled to the wire harness 16, 36 by a bent wire 24 and a clevis fastener 28. The bead 26 is capable of sliding up and down the bent wire 24. The bent wire 24 may be adjusted and bent at different angles, which adjusts an amount of deflection and noise when the bead 26 strikes the spinner blade 20. In certain embodiments, a second spinner blade 34 is rotatably coupled to the wire harness 16, 36 by the clevis fastener 28. The spinner blade 20 is rotatably coupled to a first end of the wire harness 22 by a swivel 22 and O-rings 32. Spacer beads 30 may be disposed in between the clevis fastener 28 and the swivel 22 to properly space the bent wire 24 so that the path of rotation of the bead 26 intersects with the spinner blade 20. The length of the bent wire 24 and the number of spacer beads 30 may vary. The beads 26 may be made out of various materials.

The present invention may be used with in-line spinners or L-shaped spinners. For example, the wire harness 16, 36 is an L-shaped wire harness. In such embodiments, the spinner blade 20 and the bead 26 are rotatably coupled to a first end of the L-shaped wire harness and the fishing hook 12 is coupled to a second end of the L-shaped wire harness. The line eye 18, 38 may include different configurations for connecting to a fishing line 40. For example, a first type of L-shaped wire harness 16 may include an R-bend 18 to create the line eye 18, 38. A second type of L-shaped wire harness 36 may include an endless loop bend 38 to create the line eye 18, 38. The present invention may further utilize different bends in the wire harness 16, 36, such as but not limited to hexagon, rounded, or Y-shaped forms to produce the similar action and sound.

The present invention may further include a lure body 10 coupling the hook 12 to the second end of the L-shaped wire harness. The lure body 10 may be made of metal, such as lead, and provides weight to the fishing lure. The wire harness 16, 36 and hook 12 may be molded into the lure body 10. A lure skirt 14 may further be coupled to the lure body 10 and cover at least a portion of the hook 12.

Figure 6:
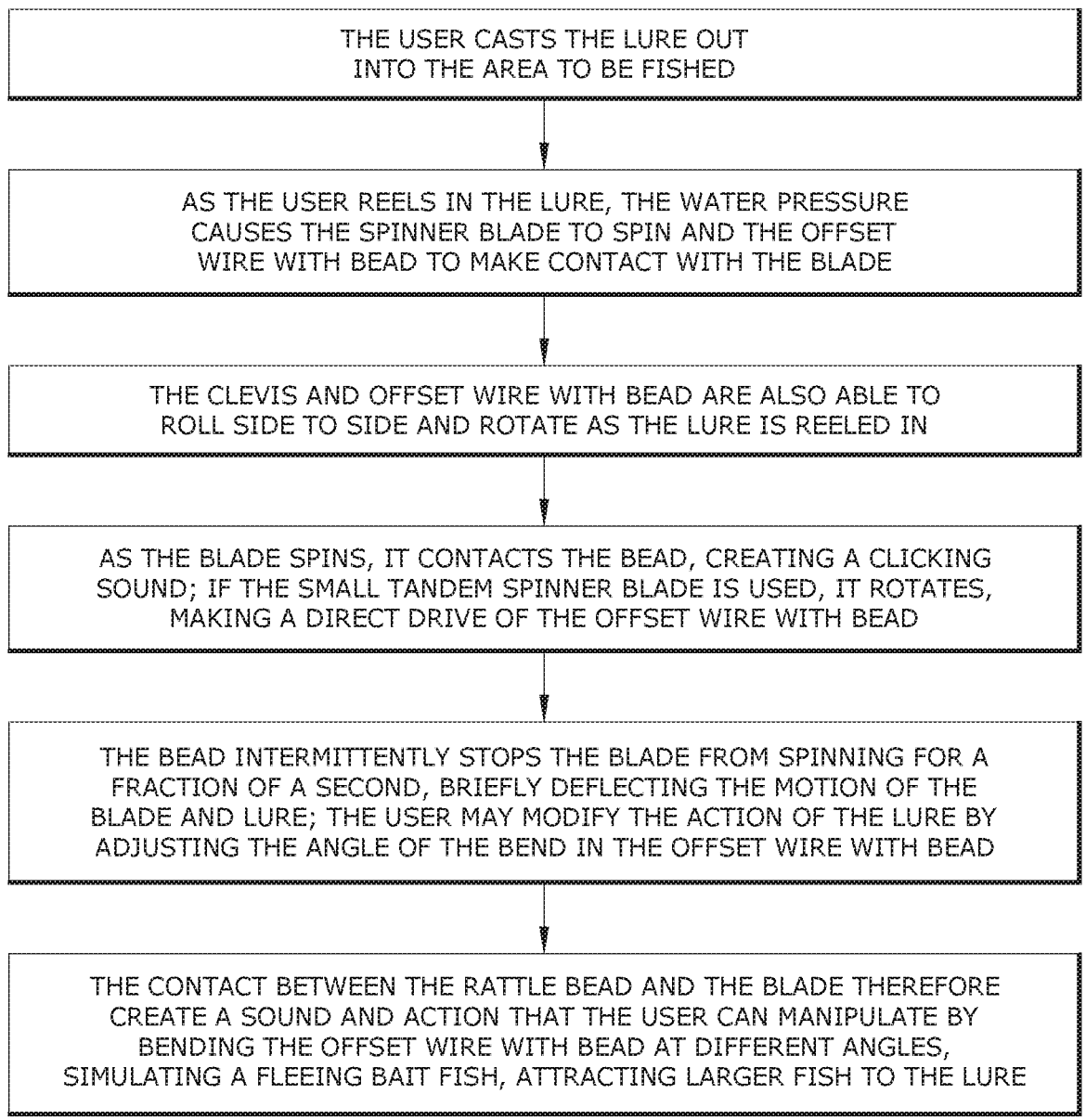
FIG. 6 is a flow chart of an embodiment of the present invention.
Figure 7:
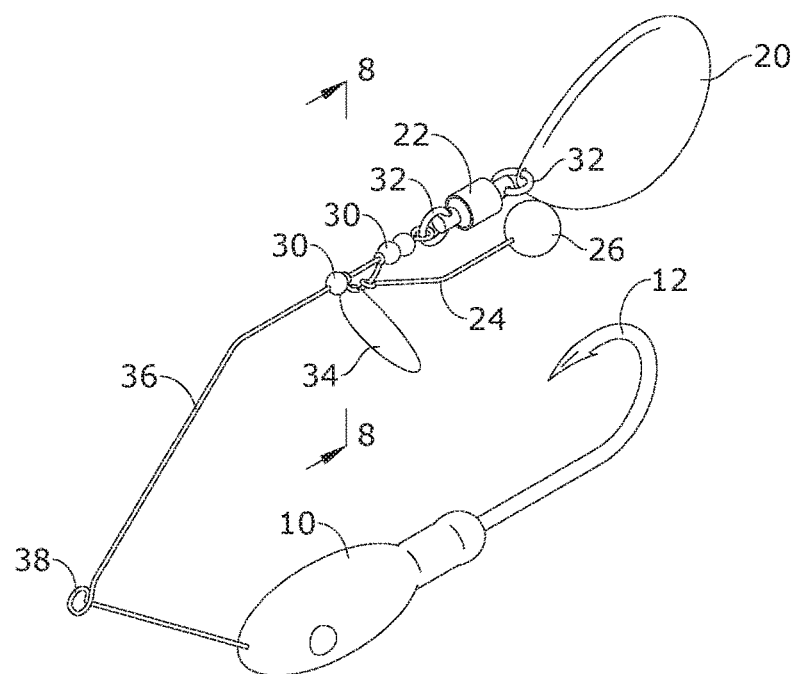
FIG. 7 is a perspective view of an embodiment of the present invention.
Figure 8:
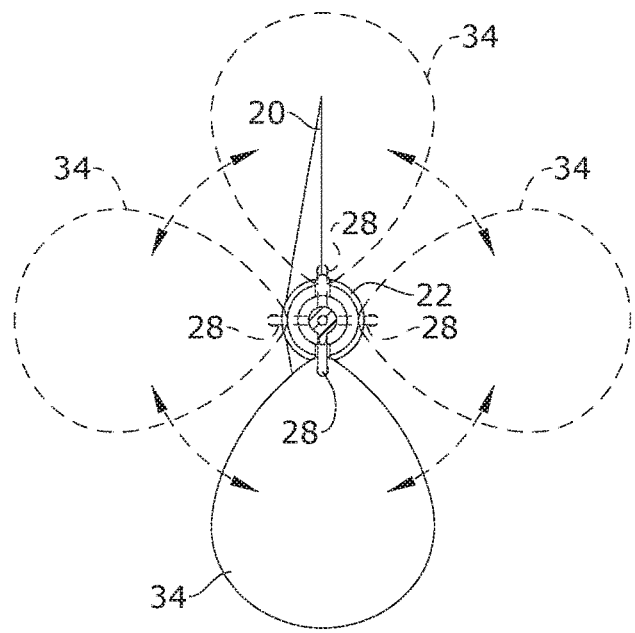
FIG. 8 is a section view of the present invention, taken along line 8-8 in FIG. 7.
Figure 9:
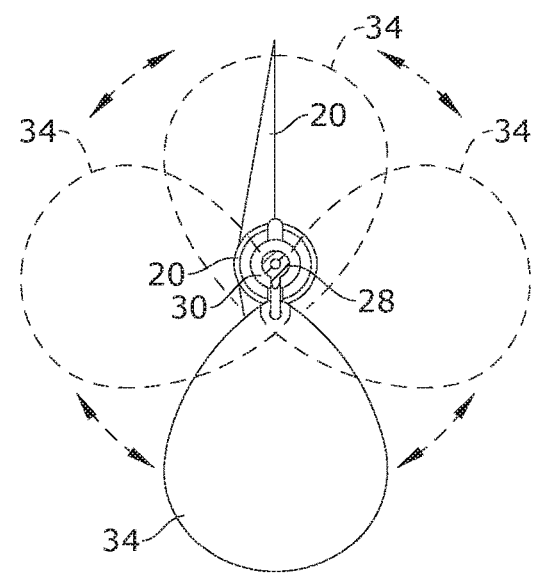
FIG. 9 is a section view of an embodiment of the present invention, illustrating a spinning motion.

Referring to FIG. 6, a method of the present invention may include the following. The user casts the lure into a body of water. Upon retrieving the lure, the revolving blade makes contact with the bead, resulting in a clacking sound. A fisherman can control the clicks per minute, simply by varying retrieval speeds. The hydro-drive rattle system spins freely while being retrieved through the water, even with the spinner blade coming into contact with the bead. As the system is pulled through the water, water pressure forces the bead into contact with the spinner blade, resulting in a clicking sound similar to fleeing bait fish. The unique action comes from the knocking of the rotating blade and the bead. The bead is free to roll and slide on the wire with the bend. During common retrieval speeds, as the spinner bait is pulled through the water, the present invention intermittently stops the blade, but only for a split second, causing the spinning blade to deflect as if it were a wounded bait fish. The intermittent sound and action makes the spinner bait highly productive at catching fish.

It should be understood, of course, that the foregoing relates to exemplary embodiments of the invention and that modifications may be made without departing from the spirit and scope of the invention as set forth in the following claims.

What is claimed is:

1. A spinner bait lure comprising:
a wire harness comprising a line eye;
a fishing hook coupled to the wire harness;
a spinner blade rotatably coupled to the wire harness in such a way that the wire harness defines a first axis of rotation for the spinner blade; and
a bead rotatably coupled to the wire harness in such a way that a second axis of rotation is defined for the bead, wherein the second axis of rotation rotates around the first axis of rotation, wherein retrieval of the spinner bait lure through a water body causes the spinner blade and the bead to rotate, and
a path of rotation of the bead intersects with the spinner blade.

2. The spinner bait lure of claim 1, wherein the bead is rotatably coupled to the wire harness by a bent wire comprising a first portion and a second portion interconnected by a bend, wherein the second portion defines the second axis of rotation.

3. The spinner bait lure of claim 2, further comprising a clevis fastener rotatably coupling the bent wire to the wire harness.

4. The spinner bait lure of claim 1, wherein the spinner blade is rotatably coupled to a first end of the wire harness by a swivel.

5. The spinner bait lure of claim 3, wherein a second spinner blade is rotatably coupled to the wire harness by the clevis fastener.

6. The spinner bait lure of claim 1, wherein the wire harness is an L-shaped wire harness, wherein the spinner blade and the bead are rotatably coupled to a first end of the L-shaped wire harness and the fishing hook is coupled to a second end of the L-shaped wire harness.

7. The spinner bait lure of claim 4, further comprising a lure body coupling the hook to the second end of the L-shaped wire harness.

8. The spinner bait lure of claim 7, further comprising a lure skirt coupled to the lure body and covering at least a portion of the hook.

9. The spinner bait lure of claim 6, wherein the line eye is an R-bend in the L-shaped wire harness.

10. The spinner bait lure of claim 6, wherein the line eye is an endless loop bend in the L-shaped wire harness.

* * * * *